US012535214B2

United States Patent
Binek et al.

(10) Patent No.: US 12,535,214 B2
(45) Date of Patent: Jan. 27, 2026

(54) ATTACHING POWERPLANT STRUCTURES TOGETHER USING FUEL INJECTOR BOLTS

(71) Applicant: RTX Corporation, Farmington, CT (US)

(72) Inventors: Lawrence A. Binek, Glastonbury, CT (US); Jose R. Paulino, Jupiter, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/640,963

(22) Filed: Apr. 19, 2024

(65) Prior Publication Data

US 2025/0327575 A1 Oct. 23, 2025

(51) Int. Cl.
| F23R 3/28 | (2006.01) |
| F02C 7/22 | (2006.01) |
| F23R 3/04 | (2006.01) |
| F23R 3/60 | (2006.01) |
| F02C 3/08 | (2006.01) |

(52) U.S. Cl.
CPC .............. *F23R 3/283* (2013.01); *F02C 7/222* (2013.01); *F23R 3/04* (2013.01); *F23R 3/60* (2013.01); *F02C 3/085* (2013.01)

(58) Field of Classification Search
CPC .... F23R 3/283; F23R 3/18; F23R 3/20; F23R 3/04; F23R 3/045; F23R 3/06; F23R 3/08; F23R 3/346; F23R 3/60
See application file for complete search history.

(56) References Cited

U.S. PATENT DOCUMENTS

| 1,460,470 | A | 7/1923 | Joseph |
| 2,385,833 | A | 10/1945 | Nahigyan |
| 2,616,258 | A | 11/1952 | Mock |
| 2,727,358 | A | 12/1955 | Howes |
| 3,053,461 | A | 9/1962 | Inglis |
| 3,153,323 | A | 10/1964 | Hamm |
| 3,295,325 | A | 1/1967 | Nelson, Jr. |
| 3,430,443 | A | 3/1969 | Richardson |

(Continued)

FOREIGN PATENT DOCUMENTS

| CN | 108590859 B | 3/2021 |
| EP | 3249301 A1 | 11/2017 |

(Continued)

OTHER PUBLICATIONS

EP Search Report for EP Patent Application No. 25171404.4 dated Jul. 8, 2025.

*Primary Examiner* — Thuyhang N Nguyen
(74) *Attorney, Agent, or Firm* — Getz Balich LLC

(57) ABSTRACT

An assembly is provided for a powerplant. This powerplant assembly includes a first powerplant structure, a second powerplant structure and a fuel injector bolt that fastens the second powerplant structure to the first powerplant structure. The fuel injector bolt includes an injector head and an injector base. The injector head longitudinally engages the second powerplant structure. The injector base projects longitudinally along a centerline out from the injector head, through a fastener aperture of the second powerplant structure and into an injector receptacle of the first powerplant structure. The injector base is attached to the first powerplant structure through a threaded interface.

13 Claims, 6 Drawing Sheets

(56) References Cited

U.S. PATENT DOCUMENTS

| | | |
|---|---|---|
| 3,603,711 A | 9/1971 | Downs |
| 3,693,354 A | 9/1972 | Hull, Jr. |
| 3,693,889 A | 9/1972 | Schuster |
| 3,703,259 A | 11/1972 | Sturgess |
| 3,719,042 A | 3/1973 | Chamberlain |
| 3,777,983 A | 12/1973 | Hibbins |
| 3,853,273 A | 12/1974 | Bahr |
| 3,886,736 A | 6/1975 | Kawaguchi |
| 3,912,164 A | 10/1975 | Lefebvre |
| 3,915,137 A | 10/1975 | Evans |
| 3,937,007 A | 2/1976 | Kappler |
| 4,028,044 A | 6/1977 | Carlisle |
| 4,028,888 A | 6/1977 | Pilarczyk |
| 4,057,371 A | 11/1977 | Pilarczyk |
| 4,081,958 A | 4/1978 | Schelp |
| 4,134,260 A | 1/1979 | Lefebvre |
| 4,242,863 A | 1/1981 | Bailey |
| 4,295,821 A | 10/1981 | Schilling |
| 4,305,255 A | 12/1981 | Davies |
| 4,398,388 A | 8/1983 | Langston, Jr. |
| 4,454,711 A | 6/1984 | Ben-Porat |
| 4,898,329 A | 2/1990 | Davis |
| 4,967,562 A | 11/1990 | Shekleton |
| 4,989,404 A | 2/1991 | Shekleton |
| 5,063,745 A | 11/1991 | Shekleton |
| 5,129,226 A | 7/1992 | Bigelow |
| 5,133,192 A | 7/1992 | Overton |
| 5,140,807 A | 8/1992 | Shekleton |
| 5,241,818 A | 9/1993 | Shekleton |
| 5,263,316 A | 11/1993 | Shekleton |
| 5,277,022 A | 1/1994 | Shekleton |
| 5,321,951 A | 6/1994 | Falls |
| 5,423,178 A | 6/1995 | Mains |
| 5,568,721 A | 10/1996 | Alary |
| 5,836,163 A | 11/1998 | Lockyer |
| 5,873,237 A | 2/1999 | Medla |
| 6,253,555 B1 | 7/2001 | Willis |
| 6,438,961 B2 | 8/2002 | Tuthill |
| 6,460,344 B1 | 10/2002 | Steinthorsson |
| 6,490,864 B1 | 12/2002 | Joos |
| 6,672,066 B2 | 1/2004 | Wrubel |
| 6,931,862 B2 | 8/2005 | Harris |
| 6,986,253 B2 | 1/2006 | Leen |
| 7,128,055 B2 | 10/2006 | Zdroik |
| 7,194,866 B1 | 3/2007 | Jones |
| 7,356,994 B2 | 4/2008 | Bleeker |
| 7,870,736 B2 | 1/2011 | Homitz |
| 7,891,191 B2 | 2/2011 | Yoshida |
| 7,954,328 B2 | 6/2011 | Atassi |
| 8,701,417 B2 * | 4/2014 | Nicholls ................. F23R 3/283 60/756 |
| 9,062,609 B2 | 6/2015 | Mehring |
| 9,383,145 B2 | 7/2016 | Weber |
| 9,551,490 B2 | 1/2017 | Dicintio |
| 9,803,498 B2 | 10/2017 | Jewess |
| 9,975,169 B2 | 5/2018 | Xu |
| 10,060,628 B2 | 8/2018 | Johnson |
| 10,139,108 B2 | 11/2018 | Thackway |
| 10,570,865 B2 | 2/2020 | Zhang |
| 10,619,855 B2 | 4/2020 | Brogan |
| 10,739,005 B2 | 8/2020 | Kironn |
| 11,053,854 B1 | 7/2021 | Mcintyre, II |
| 11,067,281 B1 * | 7/2021 | Garcia ................... F23R 3/283 |
| 11,136,901 B2 | 10/2021 | Binek |
| 11,162,416 B2 | 11/2021 | Butcher |
| 11,753,994 B2 | 9/2023 | Binek |
| 2002/0069645 A1 | 6/2002 | Mowill |
| 2006/0213180 A1 | 9/2006 | Koshoffer |
| 2007/0044476 A1 | 3/2007 | Koshoffer |
| 2008/0201008 A1 | 8/2008 | Twelves |
| 2009/0020266 A1 | 1/2009 | Weber |
| 2009/0255264 A1 | 10/2009 | Mcmasters |
| 2009/0260365 A1 | 10/2009 | Muldoon |
| 2010/0050653 A1 | 3/2010 | Lam |
| 2010/0071377 A1 | 3/2010 | Fox |
| 2010/0229557 A1 | 9/2010 | Matsumoto |
| 2010/0281871 A1 | 11/2010 | Hadley |
| 2011/0289928 A1 | 12/2011 | Fox |
| 2011/0296839 A1 | 12/2011 | Van Nieuwenhuizen |
| 2013/0031908 A1 * | 2/2013 | DiCintio ................. F23R 3/283 60/752 |
| 2013/0098048 A1 | 4/2013 | Popovic |
| 2013/0104553 A1 | 5/2013 | Stoia |
| 2013/0174559 A1 | 7/2013 | Mehring |
| 2013/0239575 A1 | 9/2013 | Chen |
| 2013/0283807 A1 | 10/2013 | Stoia |
| 2014/0144146 A1 | 5/2014 | Penz |
| 2014/0190170 A1 | 7/2014 | Cai |
| 2014/0196465 A1 | 7/2014 | Laster |
| 2014/0352312 A1 | 12/2014 | Beck |
| 2014/0367494 A1 | 12/2014 | Donovan |
| 2015/0285504 A1 | 10/2015 | Melton |
| 2015/0362194 A1 | 12/2015 | Ogata |
| 2016/0209041 A1 | 7/2016 | Twelves, Jr. |
| 2017/0122566 A1 * | 5/2017 | Piersall ................... F02C 7/222 |
| 2018/0058226 A1 | 3/2018 | Tucker |
| 2018/0304281 A1 | 10/2018 | Wirtz |
| 2020/0049349 A1 | 2/2020 | Amble |
| 2020/0109663 A1 | 4/2020 | Binek |
| 2020/0332719 A1 | 10/2020 | Binek |
| 2020/0362724 A1 | 11/2020 | Binek |
| 2020/0398386 A1 | 12/2020 | Binek |
| 2020/0400314 A1 | 12/2020 | Binek |
| 2022/0307694 A1 * | 9/2022 | Binek .................... F23R 3/346 |
| 2023/0160323 A1 | 5/2023 | Binek |
| 2023/0266008 A1 | 8/2023 | Binek |
| 2024/0044495 A1 | 2/2024 | Binek |
| 2024/0053016 A1 | 2/2024 | Mateo |

FOREIGN PATENT DOCUMENTS

| | | |
|---|---|---|
| EP | 2639508 B1 | 5/2020 |
| JP | 2004340208 A | 12/2004 |

* cited by examiner

ATTACHING POWERPLANT STRUCTURES TOGETHER USING FUEL INJECTOR BOLTS

BACKGROUND OF THE DISCLOSURE

1. Technical Field

This disclosure relates generally to a powerplant such as a turbine engine and, more particularly, to a stationary structure for the powerplant.

2. Background Information

A powerplant such as a gas turbine engine includes a stationary structure for housing and/or supporting internal rotating components of the gas turbine engine. Various stationary structures are known in the art. While these known stationary structures have various benefits, there is still room in the art for improvement.

SUMMARY OF THE DISCLOSURE

According to an aspect of the present disclosure, an assembly is provided for a powerplant. This powerplant assembly includes a first powerplant structure, a second powerplant structure and a fuel injector bolt. The first powerplant structure includes an internal volume, an injector receptacle and a first powerplant engagement surface. The injector receptacle projects longitudinally along a centerline into the first powerplant structure from the first powerplant engagement surface to the internal volume. The second powerplant structure includes a fastener aperture and a second powerplant engagement surface. The fastener aperture extends longitudinally along the centerline through the second powerplant structure to the second powerplant engagement surface. The second powerplant engagement surface longitudinally engages the first powerplant engagement surface. The fuel injector bolt fastens the second powerplant structure to the first powerplant structure. The fuel injector bolt includes an injector head and an injector base. The injector head longitudinally engages the second powerplant structure. The injector base projects longitudinally along the centerline out from the injector head, through the fastener aperture and into the injector receptacle. The injector base is attached to the first powerplant structure through a threaded interface.

According to another aspect of the present disclosure, another assembly is provided for a powerplant. This powerplant assembly includes a first powerplant structure, a second powerplant structure and a plurality of fuel injectors. The first powerplant structure is configured as or otherwise includes a combustor with a combustion chamber. The second powerplant structure is abutted against the first powerplant structure. The fuel injectors secure the second powerplant structure to the first powerplant structure. Each of the fuel injectors are configured to direct fuel into the combustion chamber.

According to still another aspect of the present disclosure, an assembly method is provided during which a second powerplant structure is abutted against a first powerplant structure. The first powerplant structure is configured as or otherwise includes a combustor with a combustion chamber. The second powerplant structure is configured as or otherwise includes an exhaust duct. The second powerplant structure is attached to the first powerplant structure using a plurality of fuel injector bolts. Each of the fuel injector bolts is configured to direct fuel into the combustion chamber. The combustion chamber is upstream of the exhaust duct along a flowpath.

The second powerplant structure may include a mounting flange that is abutted against the first powerplant structure. Each of the fuel injectors may pass through the mounting flange and may be threaded into the first powerplant structure.

The second powerplant structure may be configured as or otherwise include an exhaust duct. A flowpath of the powerplant may extend through the combustor and the exhaust duct.

The internal volume may be configured as a combustion chamber.

The first powerplant structure may include a combustor wall forming a peripheral boundary of the combustion chamber. The injector receptacle may extend longitudinally through the combustor wall to the combustion chamber.

The first powerplant structure may also include a diffuser wall, a plenum and a strut. The plenum may be between and formed by the combustor wall and the diffuser wall. The strut may extend across the plenum from the diffuser wall to the combustor wall. The injector receptacle may extend longitudinally through the diffuser wall, the strut and the combustor wall to the combustion chamber.

The assembly may also include a bladed rotor housed within the first powerplant structure.

The second powerplant structure may also include an exhaust duct for the powerplant.

The second powerplant structure may also include a mounting flange projecting out from the exhaust duct. The fastener aperture may extend longitudinally through the mounting flange.

The assembly may also include a seal element engaged with and longitudinally between the first powerplant structure and the second powerplant structure.

The fuel injector bolt may be configured to inject fuel into the internal volume.

The first powerplant structure may also include a fuel supply passage. The fuel supply passage may extend laterally within the first powerplant structure to the injector receptacle and may be configured to supply fuel to the fuel injector bolt.

The injector base may include a nozzle passage and a nozzle outlet. The nozzle passage may extend longitudinally along the centerline towards the nozzle outlet. The nozzle passage may fluidly couple the fuel supply passage to the nozzle outlet.

The injector base may also include a fuel nozzle and a fuel coupler. The fuel nozzle may include the nozzle passage and the nozzle outlet. The fuel coupler may be within the injector receptacle adjacent the fuel supply passage. The fuel coupler may fluidly couple the fuel supply passage to the nozzle passage.

The fuel coupler may include a tubular sidewall and a chamber within the tubular sidewall. A port may extend laterally through the tubular sidewall. The port may be at least partially aligned with an orifice to the fuel supply passage in a side of the injector receptacle. The chamber may be fluidly coupled with and between the port and the nozzle passage.

The fuel injector bolt may also include a splash plate connected to the injector base. The injector base may be configured to direct fuel through the nozzle passage and out of the injector base through the nozzle outlet to impinge against the splash plate.

The fuel injector bolt may be configured as a monolithic body.

The fuel injector bolt may be one of a plurality of fuel injector bolts that fasten the second powerplant structure to the first powerplant structure.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
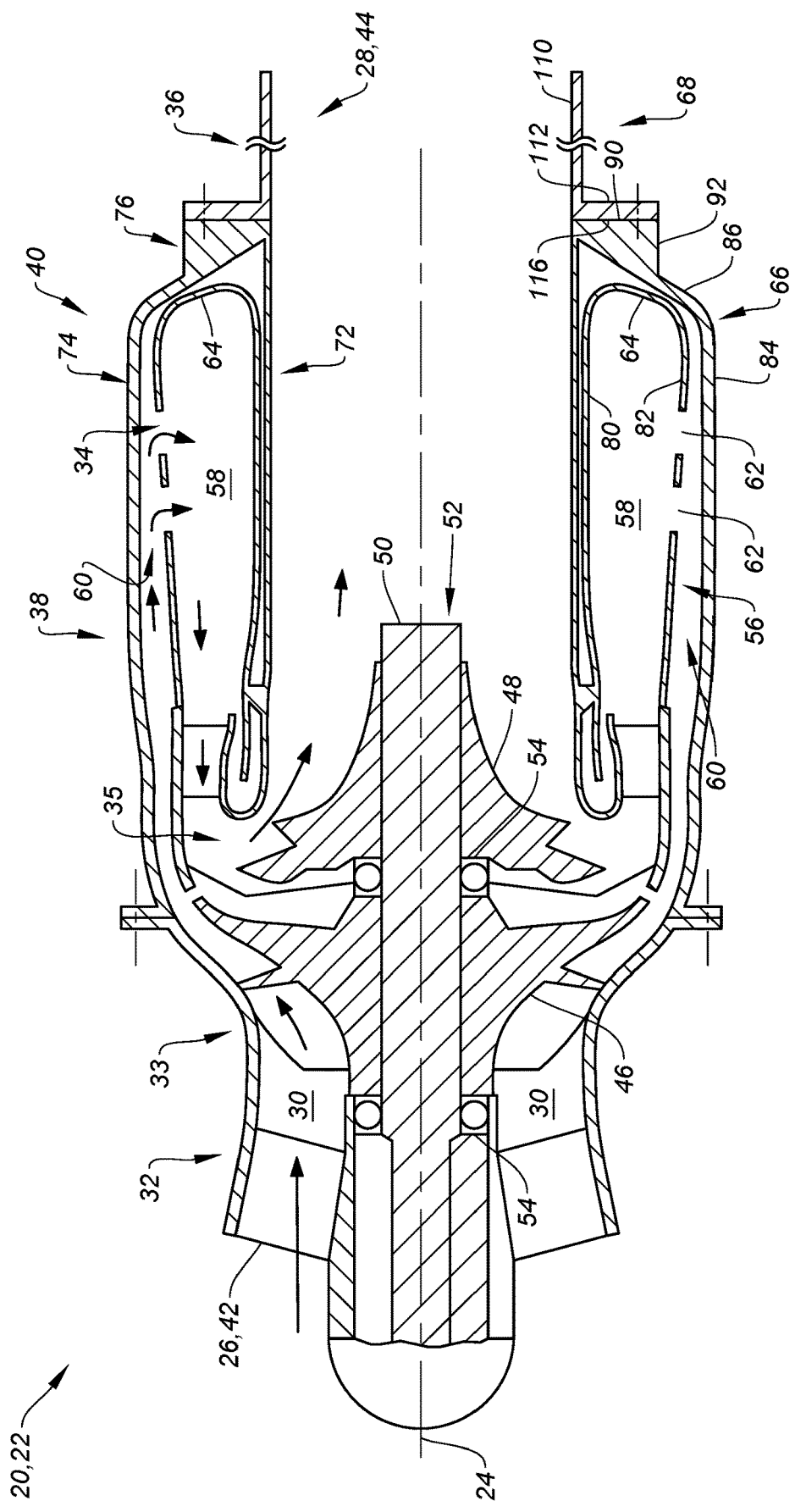
FIG. 1 is a schematic sectional illustration of a powerplant.

FIG. 1 illustrates a powerplant 20 for an aircraft. The aircraft may be an airplane, a drone (e.g., an unmanned aerial vehicle (UAV)) or any other manned or unmanned aerial vehicle or system. The aircraft powerplant 20 may be configured as, or otherwise included as part of, a propulsion system and/or a power generation system for the aircraft. The aircraft powerplant 20 of FIG. 1, for example, is configured as a single spool, radial-flow turbojet gas turbine engine 22. The aircraft powerplant 20 of the present disclosure, however, is not limited to single spool turbine engines nor to turbojet turbine engines. Moreover, it is contemplated the powerplant 20 may be used for non-aircraft applications; e.g., a ground-based industrial power generation system.

The turbine engine 22 of FIG. 1 extends axially along an axis 24 from a forward, upstream airflow inlet 26 into the turbine engine 22 to an aft, downstream combustion products exhaust 28 from the turbine engine 22. The axis 24 may be a centerline axis of the turbine engine 22. The axis 24 may be a centerline axis of one or more components and/or structures of the turbine engine 22. The axis 24 may also or alternatively be a rotational axis for one or more rotating components within the turbine engine 22.

The turbine engine 22 includes a (e.g., annular) core flowpath 30, an inlet section 32, a compressor section 33, a (e.g., reverse flow) combustor section 34, a turbine section 35 and an exhaust section 36. At least (or only) the compressor section 33, the combustor section 34 and the turbine section 35 may form a core 38 of the turbine engine 22. The turbine engine 22 also includes a stationary engine structure 40. Briefly, this engine structure 40 may house, form and/or support the engine sections 33-35. The engine structure 40 may also form the engine sections 32 and 36.

The core flowpath 30 extends within the turbine engine 22 and its engine core 38 from an airflow inlet 42 into the core flowpath 30 to a combustion products exhaust 44 from the core flowpath 30. More particularly, the core flowpath 30 of FIG. 1 extends sequentially through the inlet section 32, the compressor section 33, the combustor section 34, the turbine section 35 and the exhaust section 36 between the core inlet 42 and the core exhaust 44. The core inlet 42 of FIG. 1 forms the engine inlet 26 into the turbine engine 22. The core exhaust 44 of FIG. 1 forms the engine exhaust 28 from the turbine engine 22. However, the core inlet 42 may alternatively be discrete and downstream from the engine inlet 26 and/or the core exhaust 44 may alternatively be discrete and upstream from the engine exhaust 28.

The compressor section 33 includes a bladed compressor rotor 46. The turbine section 35 includes a bladed turbine rotor 48. Each of these engine rotors 46, 48 includes a rotor base (e.g., a hub or a disk) and a plurality of rotor blades (e.g., vanes or airfoils) arranged circumferentially around and connected to the rotor base. The rotor blades, for example, may be formed integral with or mechanically fastened, welded, brazed and/or otherwise attached to the respective rotor base.

The compressor rotor 46 may be configured as a radial flow compressor rotor (e.g., an axial inflow-radial outflow compressor rotor), and the compressor section 33 may be configured as a radial flow compressor section. The turbine rotor 48 may be configured as a radial flow turbine rotor (e.g., a radial inflow-axial outflow turbine rotor), and the turbine section 35 may be configured as a radial flow turbine section. The compressor rotor 46 is connected to the turbine rotor 48 through an engine shaft 50. At least (or only) the compressor rotor 46, the turbine rotor 48 and the engine shaft 50 collectively form an engine rotating assembly 52; e.g., a spool of the turbine engine 22 and its engine core 38. This engine rotating assembly 52 and its engine shaft 50 are rotatably supported by the engine structure 40 through a plurality of engine bearings 54; e.g., rolling element bearings, journal bearings, etc. The engine rotating assembly 52 and its members 46, 48 and 50 may thereby rotate about the axis 24.

The combustor section 34 includes an annular combustor 56 with an annular combustion chamber 58 within the combustor 56. The combustor 56 is surrounded by an annular diffuser plenum 60 located upstream of the combustion chamber 58 along the core flowpath 30. The combustor 56 may be configured as a reverse flow combustor. The combustor 56 of FIG. 1, for example, includes a plurality of inlet ports 62 and/or flow tubes fluidly coupling the diffuser plenum 60 to the combustion chamber 58. The inlet ports 62 of FIG. 1 may be arranged at (e.g., on, adjacent or proximate) and/or towards an aft bulkhead wall 64 of the combustor 56. An outlet from the combustor 56 may be arranged axially aft of an inlet to the turbine section 35. The combustor 56 may also be arranged radially outboard of and/or axially overlap (e.g., extend along) at least a (e.g., aft) portion of the turbine section 35. With this arrangement, the core flowpath 30 of FIG. 1 reverses direction (e.g., from a forward-to-aft direction to an aft-to-forward direction) a first time as the core flowpath 30 extends from the diffuser plenum 60 into the combustion chamber 58. The core flowpath 30 of FIG. 1 then reverses direction (e.g., from the aft-to-forward direction to the forward-to-aft direction) a second time as the core flowpath 30 extends from the combustion chamber 58 into the turbine section 35.

During turbine engine operation, air enters the turbine engine 22 through the inlet section 32 and its core inlet 42.

The inlet section 32 directs the air from the core inlet 42 into the core flowpath 30 and the compressor section 33. The air entering the core flowpath 30 may be referred to as "core air". This core air is compressed by the compressor rotor 46. The compressed core air is directed through a diffuser and its diffuser plenum 60 into the combustion chamber 58. Fuel is injected and mixed with the compressed core air to provide a fuel-air mixture. This fuel-air mixture is ignited within the combustion chamber 58, and combustion products thereof flow through the turbine section 35 and drive rotation of the turbine rotor 48 about the axis 24. The rotation of the turbine rotor 48 drives rotation of the compressor rotor 46 about the axis 24 and, thus, compression of the air received from the core inlet 42. The exhaust section 36 directs the combustion products out of the turbine engine 22 into an environment external to the aircraft to provide forward engine thrust.

Figure 2:
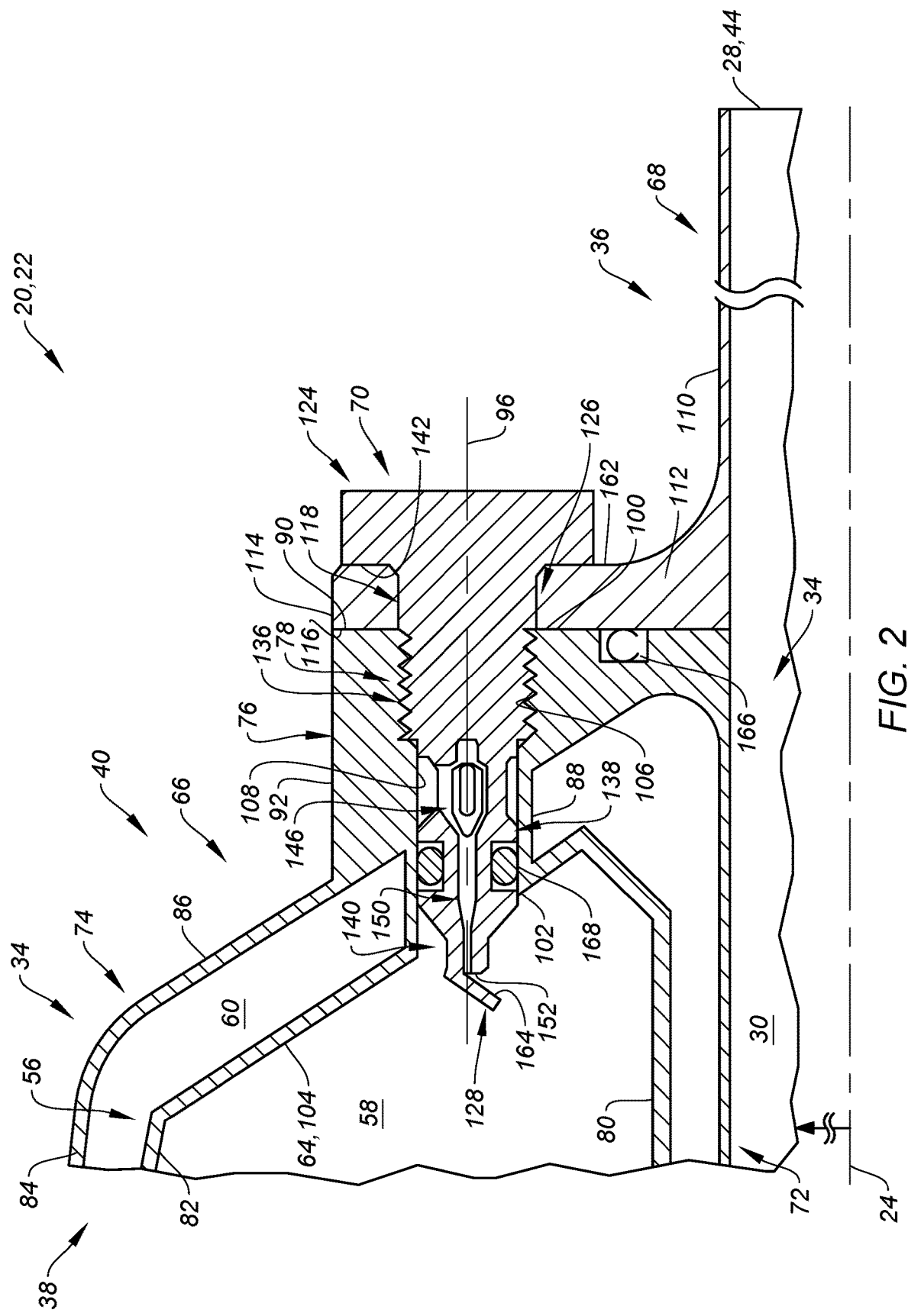
FIG. 2 is a partial sectional illustration of the powerplant at an attachment between a core structure and an exhaust structure.

The engine structure 40 of FIG. 1 is formed by a plurality of stationary structures (e.g., sub-structures) of the powerplant 20/the turbine engine 22 such as a core structure 66 and an exhaust structure 68. Referring to FIG. 2, these stationary powerplant/engine structures 66 and 68 are fixedly attached to one another using at least (or only) one or more fuel injector bolts 70; see also FIG. 3.

The core structure 66 is configured to form and/or house at least a portion or an entirety of the engine core 38; see also FIG. 1. The core structure 66 of FIG. 2, for example, includes the combustor 56, a turbine case 72 and a diffuser case 74. The core structure 66 also includes a fuel manifold 76 (see also FIGS. 3 and 4) for providing fuel to the fuel injector bolts 70 and a respective fuel injector receptacle 78 for each fuel injector bolt 70.

The combustor 56 includes a radial inner combustor wall 80, a radial outer combustor wall 82 and the bulkhead wall 64; see also FIG. 1. The inner combustor wall 80 extends along the combustion chamber 58 (e.g., generally axially along the axis 24) to a radial inner end of the bulkhead wall 64. The outer combustor wall 82 is disposed radially outboard of the inner combustor wall 80 and extends along the combustion chamber 58 (e.g., generally axially along the axis 24) to a radial outer end of the bulkhead wall 64. The bulkhead wall 64 is radially between and connected to (e.g., formed integral with) the inner combustor wall 80 and the outer combustor wall 82. The bulkhead wall 64 of FIG. 2, for example, extends diagonally (e.g., radially outward and axially forward) from an axial aft end of the inner combustor wall 80 to an axial aft end of the outer combustor wall 82. Each of these combustor walls 64, 80, 82 extends circumferentially about (e.g., completely around) the axis 24 providing the respective combustor wall 64, 80, 82 with a full-hoop (e.g., tubular or annular) geometry. With this arrangement, the inner combustor wall 80 forms a radial inner peripheral boundary of the combustion chamber 58. The outer combustor wall 82 forms a radial outer peripheral boundary of the combustion chamber 58. The bulkhead wall 64 forms an axial end peripheral boundary of the combustion chamber 58.

The turbine case 72 of FIG. 2 is spaced radially inboard of the combustor 56 and its inner combustor wall 80. The turbine case 72 extends along the combustor 56 as well as the core flowpath 30 within the turbine section 35; see also FIG. 1. The turbine case 72 extends circumferentially about (e.g., completely around) the axis 24 providing the turbine case 72 with a full-hoop (e.g., tubular) geometry. With this arrangement, the turbine case 72 forms a radial outer peripheral boundary of the core flowpath 30 within the turbine section 35 (at least downstream of the turbine rotor 48 of FIG. 1). The turbine case 72 also forms a radial inner peripheral boundary of the diffuser plenum 60, where an annular radial inner portion of the diffuser plenum 60 extends radially between and is formed by the turbine case 72 and the combustor 56 and its inner combustor wall 80.

The diffuser case 74 of FIG. 2 includes a diffuser sidewall 84 and a diffuser endwall 86; see also FIG. 1. The diffuser sidewall 84 is spaced radially outboard of the combustor 56 and its outer combustor wall 82. The diffuser sidewall 84 extends along the combustor 56 to the diffuser endwall 86. The diffuser endwall 86 of FIG. 2 extends diagonally (e.g., radially outward and axially forward) from an axial aft end of the turbine case 72 to an axial aft end of the diffuser sidewall 84. Each of these diffuser walls 84, 86 extends circumferentially about (e.g., completely around) the axis 24 providing the respective diffuser wall 84, 86 with a full-hoop (e.g., tubular or annular) geometry. With this arrangement, the diffuser sidewall 84 forms a radial outer peripheral boundary of the diffuser plenum 60, where an annular radial outer portion of the diffuser plenum 60 extends radially between and is formed by the diffuser sidewall 84 and the combustor 56 and its outer combustor wall 82. The diffuser endwall 86 forms an axial end peripheral boundary of the diffuser plenum 60, where an annular axial end portion of the diffuser plenum 60 extends axially between and is formed by the diffuser endwall 86 and the combustor 56 and its bulkhead wall 64.

While the diffuser endwall 86 of FIG. 2 is (e.g., axially and/or radially) spaced from the bulkhead wall 64, the core structure 66 may include one or more struts 88 (e.g., standoffs, pillars, pedestals, vanes, etc.) extending across the diffuser plenum 60 and its axial end portion from the diffuser endwall 86 to the bulkhead wall 64. These struts 88 are arranged and may be equispaced circumferentially around the axis 24 in an annular array; e.g., a circular array. Each of the struts 88 is connected to (e.g., formed integral with) the diffuser endwall 86 and the bulkhead wall 64.

The fuel manifold 76 may be disposed at an axial aft end of the core structure 66. The fuel manifold 76 of FIG. 2, for example, is connected to (e.g., formed integral with) the diffuser case 74 and its diffuser endwall 86. The fuel manifold 76 may also be connected to (e.g., formed integral with) the turbine case 72, for example at an intersection between the diffuser case 74 and the turbine case 72. The fuel manifold 76 of FIG. 2 projects axially along the axis 24 out from the diffuser case 74 and its diffuser endwall 86 to a core structure engagement surface 90; e.g., an annular, circumferentially uninterrupted surface. This core structure engagement surface 90 is located at the axial aft end of the core structure 66. The core structure engagement surface 90 of FIG. 2 is planar and is perpendicular to the axis 24. The fuel manifold 76 projects radially out (in a radial outward direction away from the axis 24) from the case(s) 72 and/or 74 to a radial outer side 92 of the fuel manifold 76. In FIG. 2, the manifold outer side 92 is recessed (e.g., stepped) radially inward from the diffuser sidewall 84 and may also be located radially inboard relative to the outer combustor wall 82.

Figure 4:
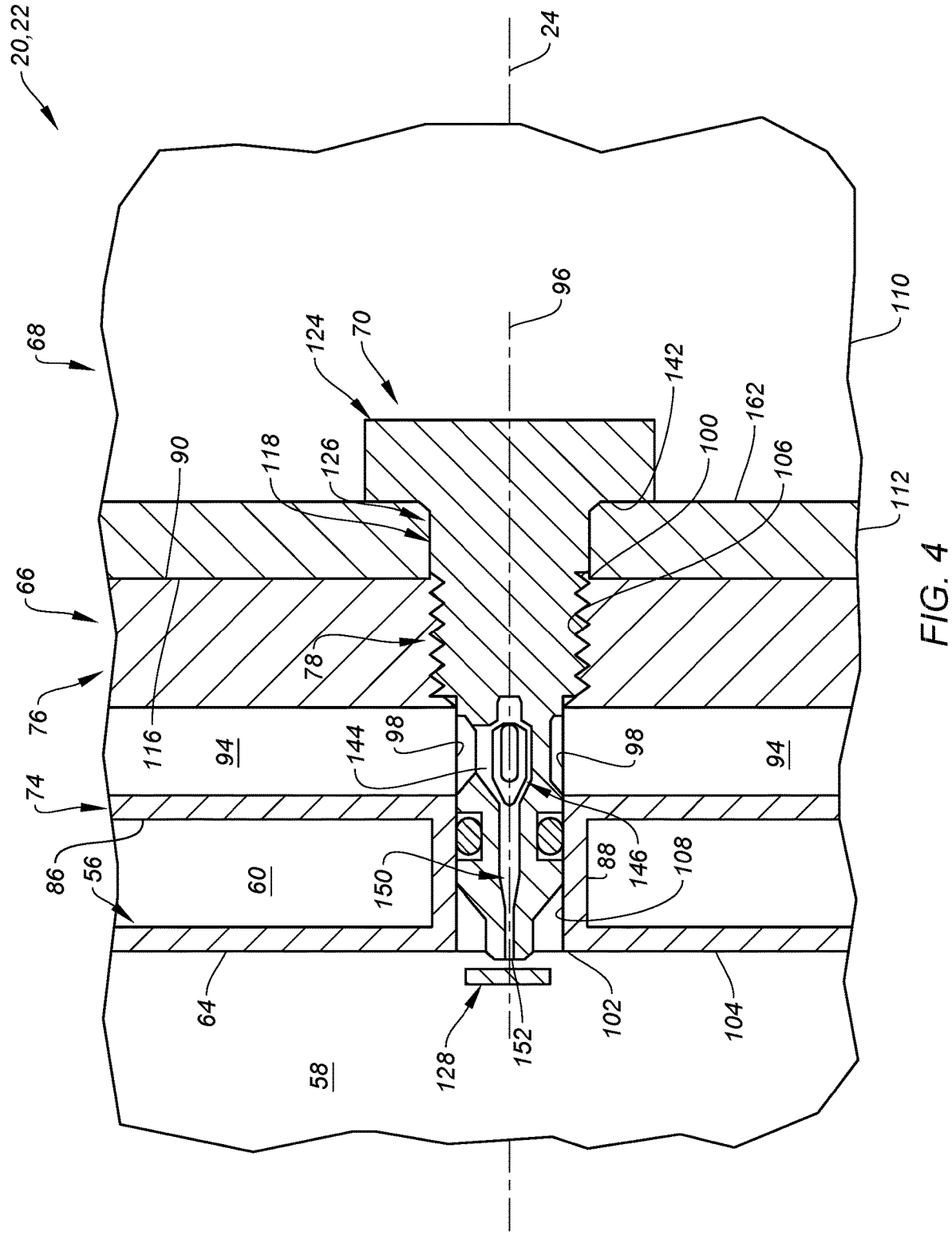
FIG. 4 is a partial side sectional illustration of the powerplant at the attachment between the core structure and the exhaust structure.

Referring to FIG. 4, the fuel manifold 76 includes one or more fuel passages 94 for each fuel injector bolt 70. Depending on proximity to an inlet into the fuel manifold 76, one of the fuel passages 94 associated with a respective fuel injector bolt 70 may be configured as a fuel supply passage to that fuel injector bolt 70. The other one of the fuel passages 94 associated with the respective fuel injector bolt 70 may be configured as a fuel surplus passage (e.g., an output passage, a return passage, etc.) for that fuel injector bolt 70 and/or a fuel supply passage for another (e.g., downstream) fuel injector bolt 70 along the fuel manifold 76. Each fuel passage 94 of FIG. 4 extends along a centerline of the respective fuel passage 94 (e.g., laterally relative to a longitudinal centerline 96 of a respective fuel injector bolt 70 and/or a respective injector receptacle 78), within the fuel manifold 76 to a fuel passage orifice 98; e.g., an outlet orifice or an inlet orifice. Each fuel passage orifice 98 of FIG. 4 fluidly couples its fuel passage 94 to a respective injector receptacle 78.

Each injector receptacle 78 is configured as an internal aperture (e.g., a bore) in the core structure 66. Each injector receptacle 78 projects longitudinally along its longitudinal centerline 96 into the core structure 66 from an exterior end 100 of the respective injector receptacle 78 to an interior end 102 of the respective injector receptacle 78, which receptacle interior end 102 is longitudinally opposite the receptacle exterior end 100. The receptacle exterior end 100 is arranged at the axial aft end of the core structure 66 in the core structure engagement surface 90. The receptacle interior end 102 is arranged at the axial end peripheral boundary of the combustion chamber 58 in a combustion chamber-side surface 104 of the bulkhead wall 64. Each injector receptacle 78 thereby extends longitudinally along its longitudinal centerline 96 from core structure engagement surface 90, sequentially through (and may be formed by) the fuel manifold 76, the diffuser endwall 86, a respective one of the struts 88 and the bulkhead wall 64, to the combustion chamber-side surface 104 of the bulkhead wall 64.

Each injector receptacle 78 includes a threaded portion 106 and a non-threaded portion 108. The receptacle threaded portion 106 is a tapped portion of the core structure 66 forming the respective injector receptacle 78. The receptacle threaded portion 106 is disposed at the receptacle exterior end 100, for example adjacent and projecting longitudinally along its longitudinal centerline 96 from the core structure engagement surface 90. The receptacle non-threaded portion 108 is an untapped (e.g., smooth, cylindrical) portion of the core structure 66 forming the respective injector receptacle 78. The receptacle non-threaded portion 108 is disposed at the receptacle interior end 102.

The fuel passage orifices 98 of FIG. 4 are disposed on opposing circumferential sides of the respective injector receptacle 78. Each fuel passage orifice 98 is disposed along an intermediate region of the respective injector receptacle 78. Each fuel passage orifice 98 of FIG. 4, for example, is located longitudinally (e.g., midway) between the receptacle exterior end 100 and the receptacle interior end 102 along the respective longitudinal centerline 96. Each fuel passage orifice 98 of FIG. 4, in particular, is disposed along the receptacle non-threaded portion 108. Each fuel passage 94 is thereby fluidly coupled with the respective injector receptacle 78 and its non-threaded portion 108 through its fuel passage orifice 98.

Referring to FIG. 2, the exhaust structure 68 is configured to form at least a portion or an entirety of the exhaust section 36; see also FIG. 1. The exhaust section 36 of FIG. 2, for example, includes an exhaust duct 110 (e.g., an exhaust case, an exhaust wall, etc.) and a mounting flange 112.

The exhaust duct 110 extends along the core flowpath 30 within the exhaust section 36; see also FIG. 1. The exhaust duct 110 extends circumferentially about (e.g., completely around) the axis 24 providing the exhaust duct 110 with a full-hoop (e.g., tubular) geometry. With this arrangement, the exhaust duct 110 forms a radial outer peripheral boundary of the core flowpath 30 within the exhaust section 36. An axial aft end of the exhaust structure 68 and its exhaust duct 110 of FIG. 2 also form the core exhaust 44 from the core flowpath 30.

The mounting flange 112 is connected to (e.g., formed integral with) the exhaust duct 110. The mounting flange 112 is located at an axial forward end of the exhaust structure 68 and its exhaust duct 110. The mounting flange 112 projects radially out (in the radial outward direction) from the exhaust duct 110 to a radial outer distal end 114 of the mounting flange 112. The mounting flange 112 extends circumferentially about (e.g., completely around) the axis 24 providing the mounting flange 112 with a full-hoop (e.g., tubular) geometry. At the axial forward end of the exhaust structure 68, the exhaust structure 68 includes an exhaust structure engagement surface 116 formed substantially (or completely) by the mounting flange 112. This exhaust structure engagement surface 116 may be an annular, circumferentially uninterrupted surface. The exhaust structure engagement surface 116 of FIG. 2 is planar and is perpendicular to the axis 24.

The mounting flange 112 includes a fastener aperture 118 (e.g., an unthreaded through-hole) for each fuel injector bolt 70. Each fastener aperture 118 extends longitudinally along the longitudinal centerline 96 through the mounting flange 112. The fastener apertures 118 are arranged and may be equispaced circumferentially about the axis 24 in an annular array; e.g., a circular array.

The exhaust structure 68 is arranged with the core structure 66. The mounting flange 112 of FIG. 2, for example, may abut (e.g., axially along the axis 24 and/or longitudinally along each longitudinal centerline 96) against or may be otherwise engaged with the fuel manifold 76. The exhaust structure engagement surface 116 may thereby (e.g., axially and/or longitudinally) contact or otherwise engage the core structure engagement surface 90. The exhaust structure 68 is also clocked about the axis 24 such that each fastener aperture 118 is aligned with a respective one of the injector receptacles 78.

Figure 5:
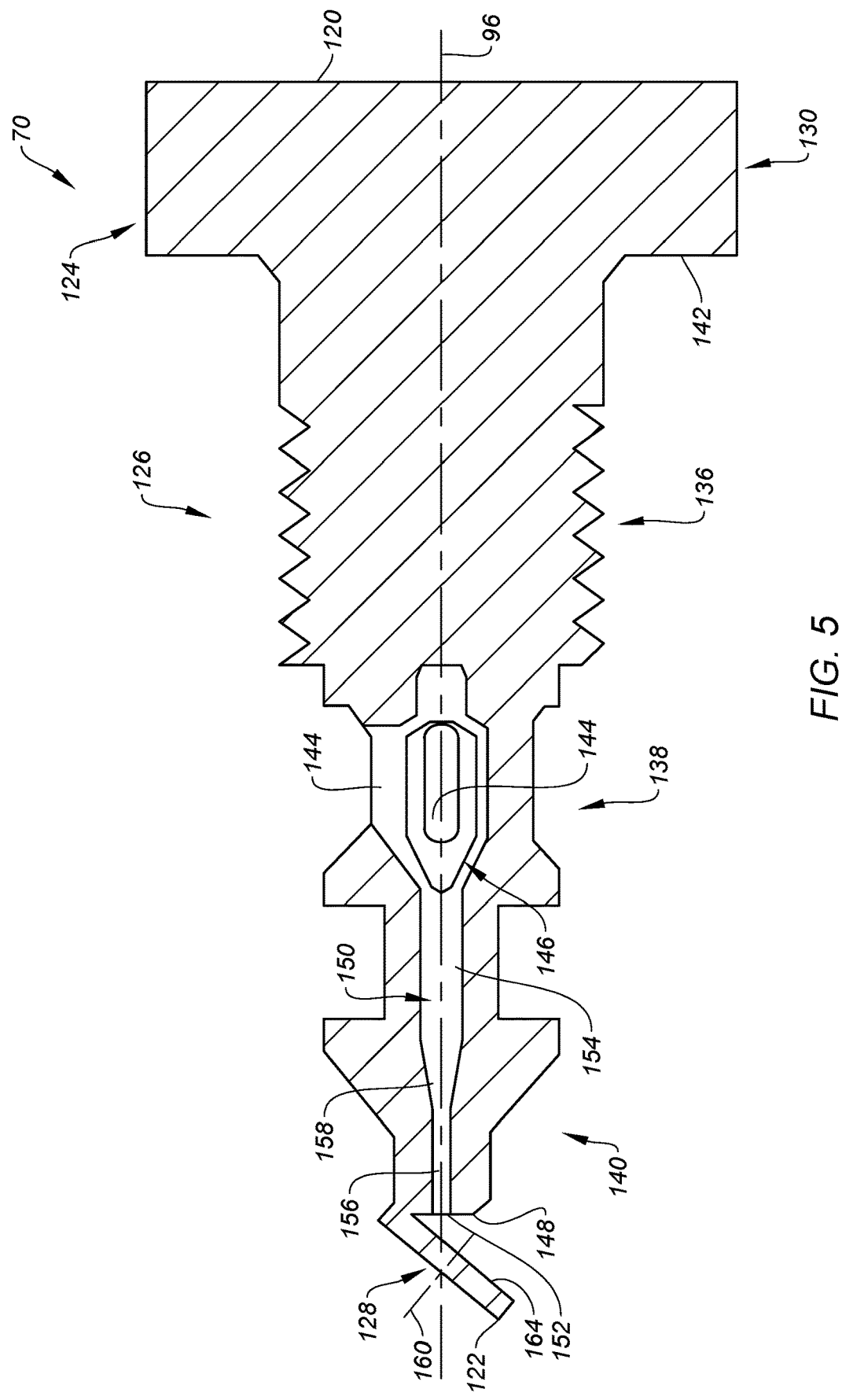
FIG. 5 is a sectional illustration of a fuel injector bolt.

Referring to FIG. 5, each fuel injector bolt 70 extends longitudinally along its longitudinal centerline 96 from an exterior end 120 of the respective fuel injector bolt 70 to an interior end 122 of the respective fuel injector bolt 70, which injector interior end 122 is longitudinally opposite the injector exterior end 120. The fuel injector bolt 70 of FIG. 5 includes a fuel injector head 124, a fuel injector base 126 and a splash plate 128, where the injector base 126 may form a shank of the respective fuel injector bolt 70.

Figure 6A:
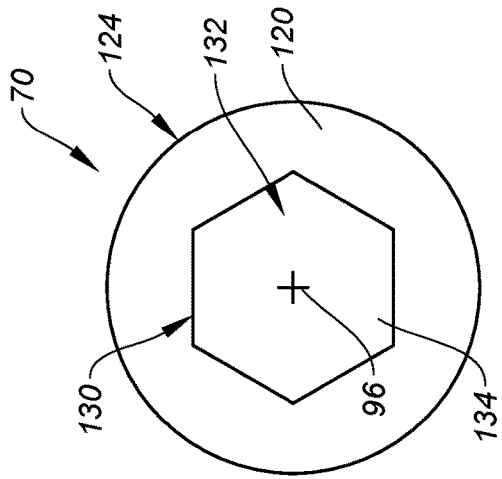
FIG. 6A is an illustration of a head of the fuel injector bolt with an external wrenching feature.
Figure 6B:
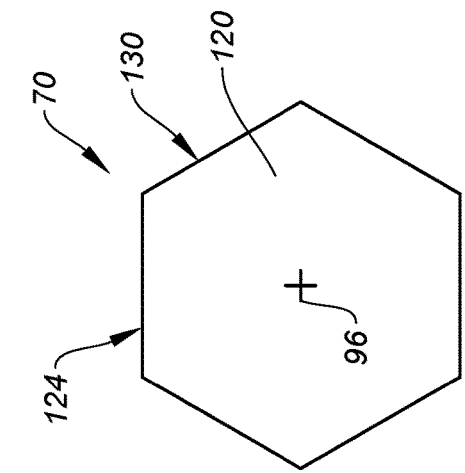
FIG. 6B is an illustration of the fuel injector head with an internal wrenching feature.

The injector head 124 is connected to the injector base 126 and arranged at the injector exterior end 120. Referring to FIGS. 6A and 6B, the injector head 124 may be configured with a wrenching feature 130. The wrenching feature 130 of FIGS. 5 and 6A is configured as an external wrenching feature. An exterior of the injector head 124 of FIG. 6A, for example, is configured one or more flats (e.g., planer surfaces) to provide the injector head 124 with a polygonal cross-sectional geometry when viewed, for example, in a reference plane perpendicular to the longitudinal centerline 96; e.g., plane of FIG. 6A. A tool (not shown) such as, but not limited to, a wrench or a socket may thereby grip the injector head 124 for installation of the respective fuel injector bolt 70 as described below. Alternatively, referring to FIG. 6B, the wrenching feature 130 may be configured as an internal wrenching feature. The injector head 124 of FIG. 6B, for example, is configured with a recess 132 for receiving and mating with a tool (not shown) such as, but not limited to, a hex-head tool (e.g., an Allen wrench or drive). The recess 132 projects longitudinally along the longitudinal centerline 96 partially into the injector head 124 from the injector exterior end 120 to an inner distal end 134 of the wrenching feature 130. The recess 132 of FIG. 6B has a polygonal cross-sectional geometry such as a hexagonal cross-sectional geometry when viewed, for example, in the reference plane; e.g., plane of FIG. 6B.

Referring to FIG. 5, the injector base 126 projects longitudinally along the longitudinal centerline 96 from the injector head 124 towards the injector interior end 122. The injector base 126 of FIG. 5 includes a (e.g., threaded) fuel injector attachment 136, a fuel coupler 138 and a fuel nozzle 140.

The injector attachment 136 is longitudinally between and connected to (e.g., formed integral with) the injector head 124 and the fuel coupler 138. The injector attachment 136 of FIG. 5, for example, extends longitudinally along the longitudinal centerline 96 to and between the injector head 124 and the fuel coupler 138. The injector attachment 136 may be a solid portion of the respective fuel injector bolt 70. The injector attachment 136, for example, may be configured without any pathways through which fluid (e.g., fuel) may travel (e.g., laterally and/or longitudinally) thereacross. More particularly, the respective fuel injector bolt 70 of FIG. 5 is configured without any apertures, bores, channels, etc. extending laterally and/or longitudinally through the injector attachment 136.

An exterior of the injector attachment 136 is configured with threads for mating with the receptacle threaded portion 106; see FIGS. 2 and 4. The threaded exterior of the injector attachment 136 may be laterally (e.g., radially relative to the longitudinal centerline 96) recessed from the exterior of the injector head 124 such that a (e.g., annular) head shoulder 142 extends laterally between the exteriors and circumferentially around the longitudinal centerline 96.

The fuel coupler 138 is longitudinally between and connected to (e.g., formed integral with or otherwise attached to) the injector attachment 136 and the fuel nozzle 140. The fuel coupler 138 of FIG. 5, for example, extends longitudinally along the longitudinal centerline 96 to and between the injector attachment 136 and the fuel nozzle 140. The fuel coupler 138 is configured with a lateral width (e.g., a diameter) that is less than a lateral width (e.g., a diameter) of the injector attachment 136.

Figure 7:
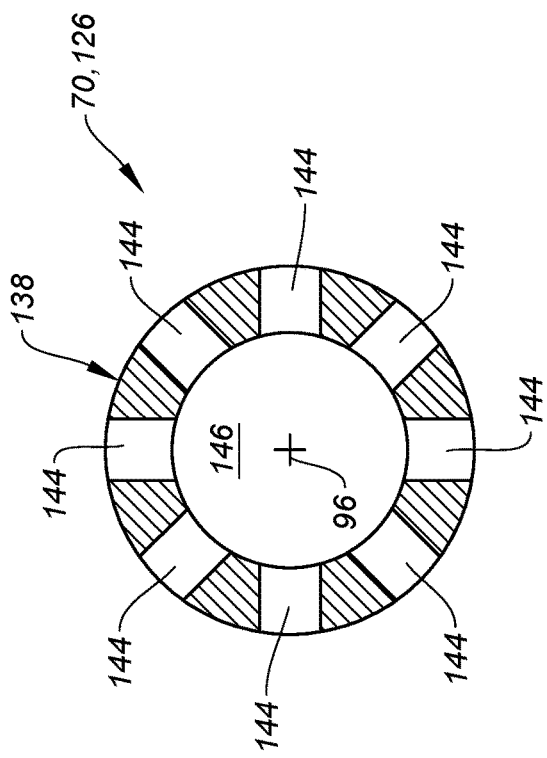
FIG. 7 is a cross-sectional illustration of the fuel injector bolt at its fuel coupler.

The fuel coupler 138 includes one or more ports 144 (e.g., apertures, windows, pass-throughs, etc.) and an internal chamber 146 (e.g., a plenum or another internal volume). Referring to FIG. 7, the ports 144 are arranged circumferentially about the longitudinal centerline 96. Each port 144 provides a flowpath from an exterior of the fuel coupler 138 into the internal chamber 146. Each port 144 of FIG. 7, for example, projects laterally (e.g., radially relative to the longitudinal centerline 96) into the fuel coupler 138 from the exterior of the fuel coupler 138 to the internal chamber 146. The internal chamber 146 is laterally and longitudinally within the fuel coupler 138. The internal chamber 146, for example, may be an internal bore within the fuel coupler 138.

Referring to FIG. 5, the fuel nozzle 140 is connected to the fuel coupler 138. The fuel nozzle 140 of FIG. 5, for example, projects longitudinally along the longitudinal centerline 96 from the fuel coupler 138 to a distal end 148 (e.g., a tip) of the fuel nozzle 140 proximate the injector interior end 122. The fuel nozzle 140 is configured with a lateral width (e.g., a diameter) that is different (e.g., less) than the lateral width of the fuel coupler 138 at the distal end 148; however, the present disclosure is not limited thereto.

The fuel nozzle 140 is configured with at least (or only) one fuel nozzle passage 150 and a fuel nozzle outlet 152. The nozzle passage 150 projects longitudinally along the longitudinal centerline 96 within the fuel nozzle 140 from the internal chamber 146 towards (e.g., to) the nozzle outlet 152. The nozzle passage 150 thereby fluidly couples the nozzle outlet 152 to the internal chamber 146. A lateral width of the nozzle passage 150 may laterally taper (e.g., decrease in size) as the nozzle passage 150 extends longitudinally towards the nozzle outlet 152. The lateral width along an upstream portion 154 of the nozzle passage 150 longitudinally adjacent and downstream of the internal chamber 146 may thereby be larger than the lateral width along a downstream portion 156 of the nozzle passage 150 longitudinally adjacent and upstream of the nozzle outlet 152. Here, the lateral width is uniform (e.g., constant) along the upstream and the downstream portions 154 and 156, where an intermediate portion 158 of the nozzle passage 150 between the upstream and the downstream portions 154 and 156 is tapered. The present disclosure, however, is not limited to such an exemplary tapered configuration.

The nozzle outlet 152 is disposed at the nozzle distal end 148. This nozzle outlet 152 is configured as a port or an orifice which fluidly couples the nozzle passage 150 to an environment outside of the respective fuel injector and its fuel nozzle 140; e.g., the combustion chamber 58 of FIGS. 2 and 4. The nozzle outlet 152 thereby forms an outlet from the nozzle passage 150 and, more generally, from the respective fuel injector bolt 70 and its fuel nozzle 140.

The splash plate 128 is connected to (e.g., formed integral with or otherwise attached to) the fuel nozzle 140 at the injector interior end 122. The splash plate 128 of FIG. 5 is configured with a (e.g., circular) puck-like body. This splash plate 128 is canted relative to the injector base 126 and the longitudinal centerline 96. A centerline axis 160 of the splash plate 128, for example, is angularly offset from the longitudinal centerline 96 by a non-zero acute angle equal to or greater than twenty degrees (20°); e.g., between twenty degrees (20°) and forty degrees (40°) or between forty degrees (40°) and sixty degrees (60°). The present disclosure, however, is not limited to such an exemplary arrangement.

Figure 3:
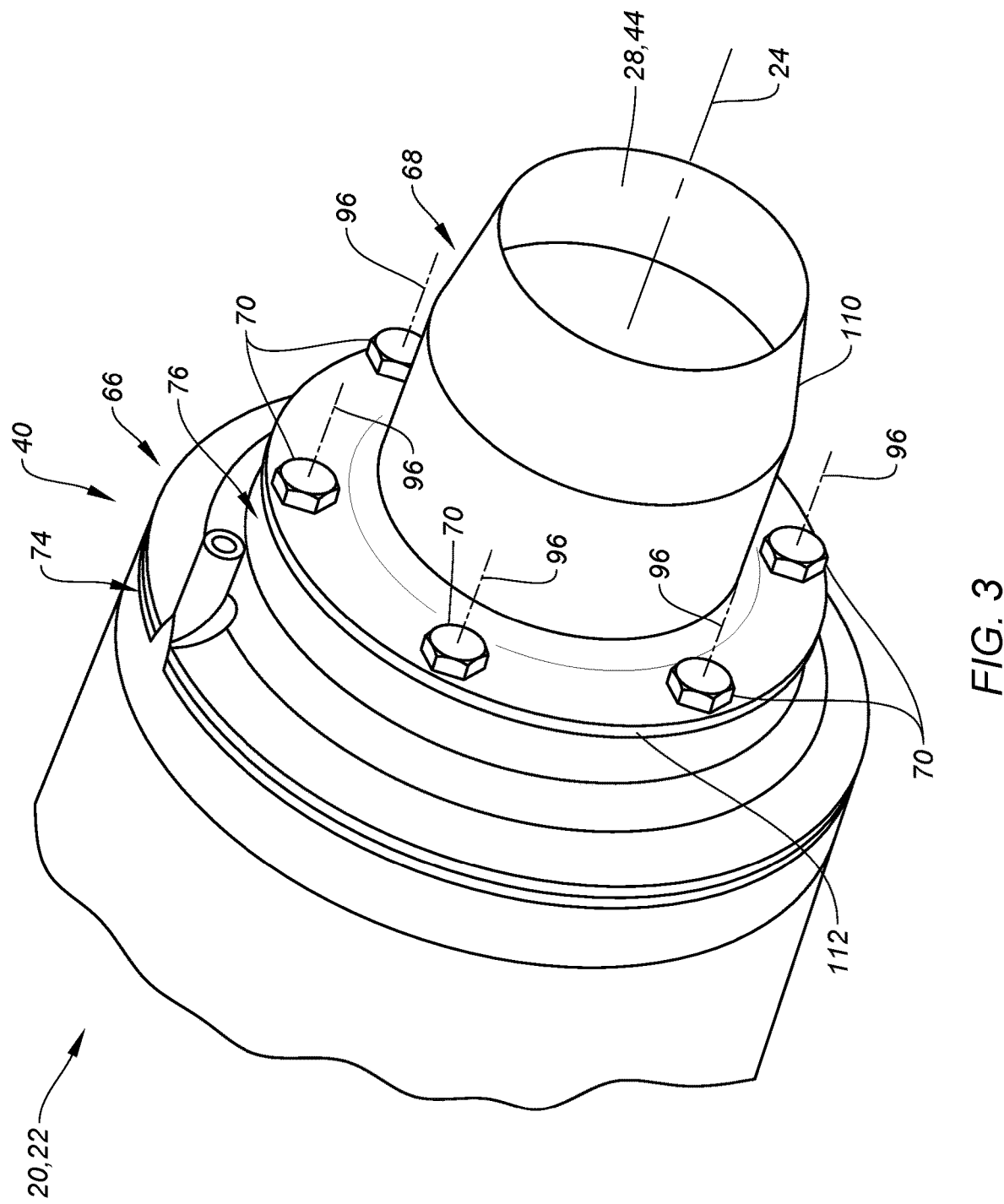
FIG. 3 is a partial perspective illustration of the powerplant at the attachment between the core structure and the exhaust structure.

Referring to FIG. 3, the fuel injector bolts 70 are used to attach and secure the exhaust structure 68 to the core structure 66. Each fuel injector bolt 70 of FIG. 2, for example, projects longitudinally through a respective one of the fastener apertures 118 and is threaded into a respective one of the injector receptacles 78. For example, during assembly, the fuel nozzle 140 is inserted longitudinally through the respective fastener aperture 118 into the respective injector receptacle 78 at the receptacle exterior end 100. The respective fuel nozzle 140 is moved longitudinally through the receptacle threaded portion 106 and into the receptacle non-threaded portion 108. The external threads of the injector attachment 136 are mated with the internal threads of the receptacle threaded portion 106. The respective fuel injector bolt 70 is threaded (e.g., screwed) into the respective injector receptacle 78 using a tool (not shown) until, for example, the head shoulder 142 is longitudinally abutted and preloaded direct against a surface 162 of the mounting flange 112 longitudinally opposite the exhaust structure engagement surface 116, or indirectly against the mounting flange surface 162 through a washer (not shown). Each fuel injector bolt 70 is thereby removably attached to the engine structure 40 by a threaded interface between the interior threads along the receptacle threaded portion 106 and the exterior threads along the injector attachment 136.

Moreover, by threading the injector attachment 136 into the receptacle threaded portion 106, each fuel injector bolt 70 clamps the mounting flange 112 (e.g., axially and/or longitudinally) between its injector head 124 and the core structure 66.

In the assembled position of FIG. 4, each fuel passage orifice 98 in FIG. 4 is aligned with the fuel coupler 138 and at least one of its ports 144. One of the ports 144, for example, may at least partially (or completely) longitudinally overlap and may at least partially (or completely) circumferentially overlap each fuel passage orifice 98 to provide a (e.g., unobstructed, or only partially obstructed) fluid coupling between the respective fuel passage 94 and the internal chamber 146. Note, the ports 144 may be configured with the fuel coupler 138 (e.g., sized and spaced around the longitudinal centerline 96) such that, for example, at least one of these ports 144 is at least partially (or completely) aligned with each fuel passage orifice 98 no matter how the fuel nozzle 140 is clocked about the longitudinal centerline 96 within the respective injector receptacle 78. However, in some embodiments, each fuel injector bolt 70 may be clocked to a certain position about its longitudinal centerline 96 in order to particularly position its splash plate 128 within the combustion chamber 58. Of course, it is also contemplated each fuel injector bolt 70 may omit its splash plate 128 in other embodiments.

By forming the exhaust structure 68 discretely from the core structure 66, different exhaust structure configurations may be paired with a common core structure configuration/engine core configuration. This may facilitate adaptation of the common core structure configuration/engine core configuration to multiple different aircraft platforms. In addition, by utilizing the fuel injector bolts 70 to attach the exhaust structure 68 to the core structure 66, powerplant hardware may be reduced.

Referring to FIG. 4, during engine operation, fuel is directed into the fuel manifold 76 from a fuel source (not shown). This fuel is dispersed to the fuel injector bolts 70, and directed into the nozzle passage 150 of each fuel injector bolt 70. Referring to FIG. 2, the fuel within the nozzle passage 150 is directed out of the respective fuel injector bolt 70 through the nozzle outlet 152 into a spatial gap between (a) the fuel nozzle 140 and its nozzle outlet 152 and (b) the splash plate 128 and its splash plate surface 164 as a fuel jet. This fuel jet flows through the spatial gap and impacts (e.g., impinges against) the splash plate surface 164. Upon impacting the splash plate surface 164, the splash plate 128 redirects (e.g., disperses) the impinging fuel jet radially outward (relative to the longitudinal centerline 96) into a (e.g., uniform and/or symmetrical) disperse radiant pattern; e.g., an arcuate and/or a generally planar film. The fuel may thereby be more evenly dispersed/spread/mixed into fluid (e.g., air, fuel-air mixture, combustion products, etc.) within the combustion chamber 58. Providing such relatively even mixing of the fuel and the fluid may in turn increase fuel burn efficiency and/or reduce likelihood of carbon formation within the engine.

In some embodiments, referring to FIG. 2, an annular seal element 166 (e.g., a ring seal) may be engaged with and arranged (e.g., axially and/or longitudinally) between the core structure 66 and the exhaust structure 68. Examples of the seal element 166 include, but are not limited to, an O-ring element, a C-seal element and a crush seal element.

In some embodiments, each fuel injector bolt 70 may be configured with at least (or only) one annular seal element 168. The seal element 168 may be configured as a ring seal such as, but not limited to, an O-ring element, a C-seal element, a crush seal element, a washer, etc. The seal element 168 of FIG. 2 is seated in an annular seal receptacle (e.g., a notch, a groove, a channel, etc.) in the injector base 126. The seal receptacle of FIG. 2, in particular, is located in an interior portion of the fuel coupler 138. However, in other embodiments, the seal receptacle may be located in an outer portion of the fuel nozzle 140, or in another portion of the respective fuel injector bolt 70 and its injector base 126 longitudinally between the fuel coupler 138 and the fuel nozzle 140. The seal element 168 of FIG. 2 is laterally engaged with the injector base 126 and the receptacle non-threaded portion 108. The seal element 168 may thereby form a seal interface between the respective fuel injector bolt 70 and the core structure 66 such that the fuel, for example, does not leak (e.g., in an inward direction) into the combustion chamber 58.

In some embodiments, each longitudinal centerline 96 may be arranged parallel with the centerline axis 24. The present disclosure, however, is not limited to such an exemplary arrangement.

In some embodiments, any one, some or all of the powerplant members 66, 68 and/or 70 may each be configured as a discrete monolithic body. The core structure 66, the exhaust structure 68 and/or each fuel injector bolt 70, for example, may each be additively manufactured, cast, machined and/or otherwise forms as a single integral, unitary body. By contrast, a non-monolithic body may include parts that are discretely formed from one another, where those parts are subsequently mechanically fastened and/or otherwise attached to one another.

The turbine engine 22 is described above as a single spool, radial-flow turbojet gas turbine engine for ease of description. The present disclosure, however, is not limited to such an exemplary turbine engine. The turbine engine 22, for example, may alternatively be configured as an axial flow gas turbine engine. The turbine engine 22 may be configured as a direct drive gas turbine engine. The turbine engine 22 may alternatively include a geartrain that connects one or more rotors together such that the rotors rotate at different speeds. The turbine engine 22 may be configured with a single spool (e.g., see FIG. 1), two spools, or with more than two spools. The turbine engine 22 may be configured as a turbofan engine, a turboshaft engine, a turboprop engine, a propfan engine, a pusher fan engine or any other type of turbine engine. In addition, while the turbine engine 22 is described above with an exemplary reverse flow annular combustor, the turbine engine 22 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a powerplant, comprising:
a first powerplant structure including an internal volume, an injector receptacle and a first powerplant engagement surface, the injector receptacle projecting longitudinally along a centerline into the first powerplant structure from the first powerplant engagement surface to the internal volume, wherein the longitudinal centerline is arranged parallel or along a same direction as a centerline axis of the powerplant;

a second powerplant structure including a fastener aperture and a second powerplant engagement surface, the fastener aperture extending longitudinally along the centerline through the second powerplant structure to the second powerplant engagement surface, and the second powerplant engagement surface longitudinally engaging the first powerplant engagement surface, wherein the second powerplant structure further includes an exhaust duct for the powerplant, wherein the exhaust duct is positioned downstream of a combustion chamber of the powerplant; and a fuel injector bolt fastening the second powerplant structure to the first powerplant structure, the fuel injector bolt including an injector head and an injector base, the injector head longitudinally engaging the second powerplant structure, the injector base projecting longitudinally along the centerline out from the injector head, through the fastener aperture and into the injector receptacle, and the injector base attached to the first powerplant structure through a threaded interface, wherein the fuel injector bolt is configured to inject fuel into the internal volume comprising the combustion chamber, wherein the fuel enters the combustion chamber to generate combustion products to flow to the exhaust duct.

2. The assembly of claim 1, wherein
the first powerplant structure further includes a combustor wall forming a peripheral boundary of the combustion chamber; and
the injector receptacle extends longitudinally through the combustor wall to the combustion chamber.

3. The assembly of claim 1, further comprising a bladed rotor housed within the first powerplant structure.

4. The assembly of claim 1, wherein
the second powerplant structure further includes a mounting flange projecting out from the exhaust duct; and
the fastener aperture extends longitudinally through the mounting flange.

5. The assembly of claim 1, further comprising a seal element engaged with and longitudinally between the first powerplant structure and the second powerplant structure.

6. The assembly of claim 1, wherein
the first powerplant structure further includes a fuel supply passage; and
the fuel supply passage extends laterally within the first powerplant structure to the injector receptacle and is configured to supply fuel to the fuel injector bolt.

7. The assembly of claim 6, wherein
the injector base includes a nozzle passage and a nozzle outlet; and
the nozzle passage extends longitudinally along the centerline towards the nozzle outlet, and the nozzle passage fluidly couples the fuel supply passage to the nozzle outlet.

8. The assembly of claim 7, wherein
the injector base further includes a fuel nozzle and a fuel coupler;
the fuel nozzle includes the nozzle passage and the nozzle outlet; and the fuel coupler is within the injector receptacle adjacent the fuel supply passage, and the fuel coupler fluidly couples the fuel supply passage to the nozzle passage.

9. The assembly of claim 8, wherein
the fuel coupler includes a tubular sidewall and a chamber within the tubular sidewall;
a port extends laterally through the tubular sidewall, and the port is at least partially aligned with an orifice to the fuel supply passage in a side of the injector receptacle; and
the chamber is fluidly coupled with and between the port and the nozzle passage.

10. The assembly of claim 1, wherein the fuel injector bolt is configured as a monolithic body.

11. The assembly of claim 1, wherein the fuel injector bolt is one of a plurality of fuel injector bolts that fasten the second powerplant structure to the first powerplant structure.

12. An assembly for a powerplant, comprising:
a first powerplant structure including a combustion chamber, an injector receptacle and a first powerplant engagement surface, the injector receptacle projecting longitudinally along a centerline into the first powerplant structure from the first powerplant engagement surface to the combustion chamber;

a second powerplant structure including a fastener aperture and a second powerplant engagement surface, the fastener aperture extending longitudinally along the centerline through the second powerplant structure to the second powerplant engagement surface, and the second powerplant engagement surface longitudinally engaging the first powerplant engagement surface; and a fuel injector bolt fastening the second powerplant structure to the first powerplant structure, the fuel injector bolt including an injector head and an injector base, the injector head longitudinally engaging the second powerplant structure, the injector base projecting longitudinally along the centerline out from the injector head, through the fastener aperture and into the injector receptacle, and the injector base attached to the first powerplant structure through a threaded interface;

wherein the first powerplant structure further includes a diffuser wall, a plenum, a strut and a combustor wall that forms a peripheral boundary of the combustion chamber;

wherein the plenum is between and formed by the combustor wall and the diffuser wall;

wherein the strut extends across the plenum from the diffuser wall to the combustor wall; and wherein the injector receptacle extends longitudinally through the diffuser wall, the strut and the combustor wall to the combustion chamber.

13. An assembly for a powerplant, comprising:
a first powerplant structure including an internal volume, an injector receptacle and a first powerplant engagement surface, the injector receptacle projecting longitudinally along a centerline into the first powerplant structure from the first powerplant engagement surface to the internal volume;

a second powerplant structure including a fastener aperture and a second powerplant engagement surface, the fastener aperture extending longitudinally along the centerline through the second powerplant structure to the second powerplant engagement surface, and the second powerplant engagement surface longitudinally engaging the first powerplant engagement surface; and a fuel injector bolt fastening the second powerplant structure to the first powerplant structure, the fuel injector bolt including an injector head and an injector base, the injector head longitudinally engaging the second powerplant structure, the injector base projecting longitudinally along the centerline out from the injector head, through the fastener aperture and into the injector receptacle, and the injector base attached to the first powerplant structure through a threaded interface;

wherein the fuel injector bolt further includes a nozzle passage, an injector base and a splash plate connected to the injector base; and wherein the injector base is configured to direct fuel through the nozzle passage and out of the injector base through a nozzle outlet to impinge against the splash plate.

* * * * *